United States Patent
Fukuo et al.

(10) Patent No.: US 10,367,346 B2
(45) Date of Patent: Jul. 30, 2019

(54) ELECTRIC LEAKAGE PROTECTION DEVICE AND FEED CONTROL DEVICE

(71) Applicant: Panasonic Intellectual Property Management Co., Ltd., Osaka (JP)

(72) Inventors: Naoki Fukuo, Mie (JP); Koji Yamato, Mie (JP); Hideki Kawahara, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 276 days.

(21) Appl. No.: 15/501,537

(22) PCT Filed: Feb. 26, 2015

(86) PCT No.: PCT/JP2015/000974
§ 371 (c)(1),
(2) Date: Feb. 3, 2017

(87) PCT Pub. No.: WO2016/021088
PCT Pub. Date: Feb. 11, 2016

(65) Prior Publication Data
US 2017/0222424 A1 Aug. 3, 2017

(30) Foreign Application Priority Data
Aug. 7, 2014 (JP) ................................. 2014-161726

(51) Int. Cl.
*H02H 1/00* (2006.01)
*H01H 83/02* (2006.01)
(Continued)

(52) U.S. Cl.
CPC .......... *H02H 1/0007* (2013.01); *H01H 83/02* (2013.01); *H02H 3/04* (2013.01);
(Continued)

(58) Field of Classification Search
CPC .............................. H02H 1/0007; H01H 83/02
See application file for complete search history.

(56) References Cited

U.S. PATENT DOCUMENTS

2009/0096528 A1* 4/2009 Nakai ................. H03G 1/0088
330/278
2010/0194354 A1 8/2010 Gotou et al.
(Continued)

FOREIGN PATENT DOCUMENTS

CN 200947538 Y 9/2007
CN 102074930 A 5/2011
(Continued)

OTHER PUBLICATIONS

English translation of Canadian Office Action issued in Application No. 2,957,510 dated Dec. 5, 2017, 4 pages.
(Continued)

*Primary Examiner* — Scott Bauer
(74) *Attorney, Agent, or Firm* — McDermott Will & Emery LLP

(57) ABSTRACT

The electric leakage protection device (feed control device includes an electric leakage detector, an electric leakage protector, and a self leakage generator. The electric leakage detector outputs an electric leakage detection signal when a current leaked from a main circuit exceeds a threshold value. The electric leakage protector opens a contact device interposed in the main circuit when receiving the electric leakage detection signal. The self leakage generator includes; a first short circuit having a first electric resistance component and a first switch component electrically connected in series with each other, and a second short circuit having a second electric resistance component and a second switch component electrically connected in series with each other. The first short circuit and the second short circuit are electrically (Continued)

connected in parallel with each other with regard to a pair of power supply paths constituting the main circuit.

11 Claims, 3 Drawing Sheets

(51) Int. Cl.
  *H02H 3/16* (2006.01)
  *H02H 3/33* (2006.01)
  *H02H 3/32* (2006.01)
  *H02H 3/04* (2006.01)
(52) U.S. Cl.
  CPC .............. *H02H 3/044* (2013.01); *H02H 3/16* (2013.01); *H02H 3/325* (2013.01); *H02H 3/33* (2013.01); *H02H 3/334* (2013.01)

(56) References Cited

U.S. PATENT DOCUMENTS

| | | |
|---|---|---|
| 2013/0120883 A1 | 5/2013 | Yuno et al. |
| 2013/0155563 A1 | 6/2013 | Huang et al. |

FOREIGN PATENT DOCUMENTS

| | | |
|---|---|---|
| DE | 102008006360 B3 | 7/2009 |
| JP | S59-169321 A | 9/1984 |
| JP | 2012-005193 A | 1/2012 |
| JP | 2012-161150 A | 8/2012 |
| JP | 2013-128337 A | 6/2013 |
| TW | 201328094 A | 7/2013 |
| WO | 2012/014364 A1 | 2/2012 |
| WO | 2012/104703 A1 | 8/2012 |

OTHER PUBLICATIONS

Office Action issued in corresponding Taiwanese Patent No. 1555300 dated Jan. 25, 2016.

International Search Report issued in Application No. PCT/JP2015/000974 dated Apr. 28, 2015, with English translation.

* cited by examiner

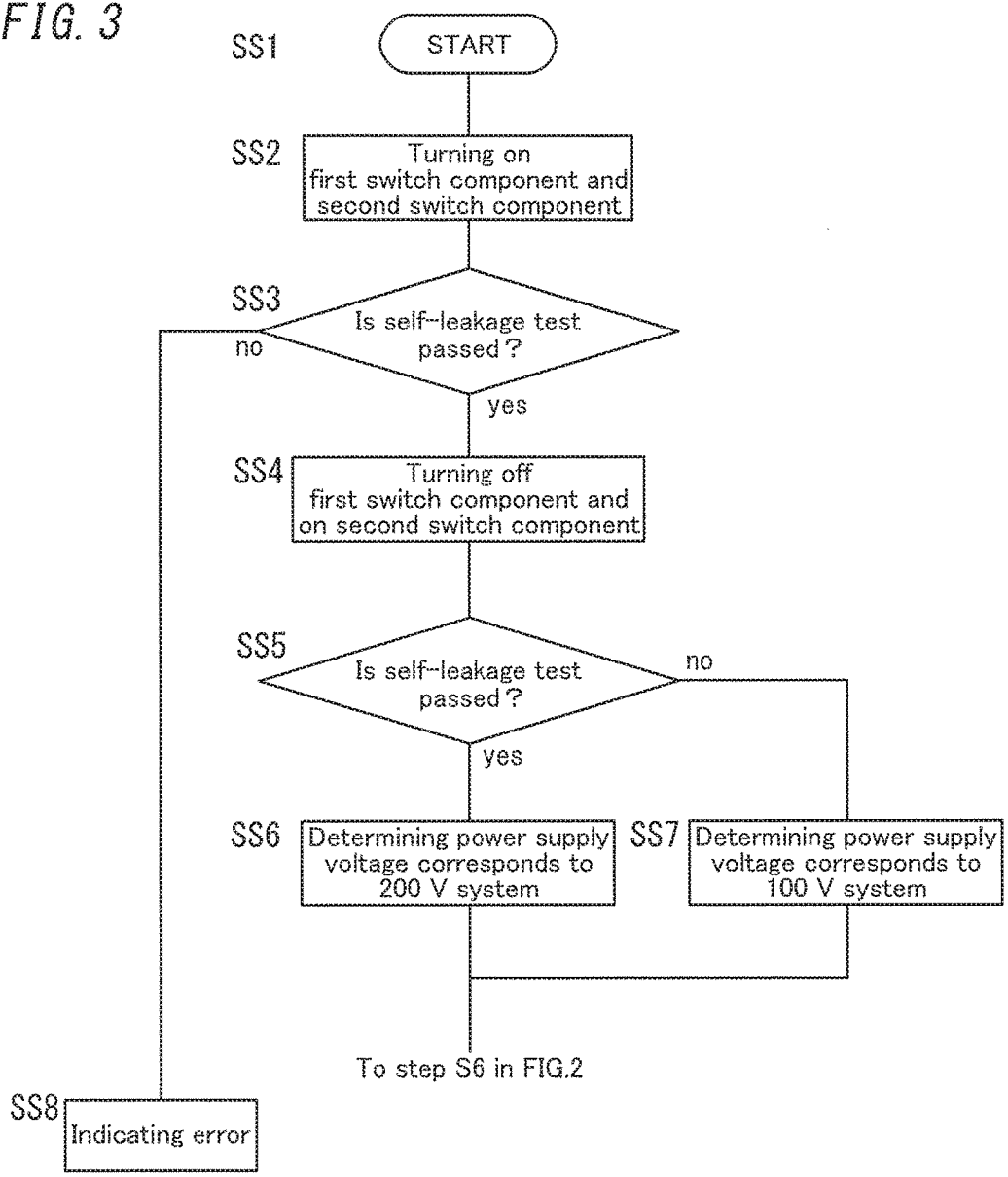

ELECTRIC LEAKAGE PROTECTION DEVICE AND FEED CONTROL DEVICE

RELATED APPLICATIONS

This application is the U.S. National Phase under 35 U.S.C. § 371 of International Application No. PCT/JP2015/000974, filed on Feb. 26, 2015, which in turn claims the benefit of Japanese Application No. 2014-161726, filed on Aug. 7, 2014, the disclosures of which are incorporated by reference herein.

TECHNICAL FIELD

The present invention relates to electric leakage protection devices and feed control devices, and particularly to an electric leakage protection device for detecting a leakage current from a circuit and then protecting the circuit and a feed control device which includes the electric leakage protection device and is configured to control supply of power to the circuit.

BACKGROUND ART

In the past, there has been proposed a feed control device as disclosed in Document 1 (JP 2013-128337 A). The feed control device disclosed in Document 1 includes a controller configured to close a relay interposed in a main circuit and control a self leakage generator to cause pseudo electric leakage in the main circuit in response to reception of a state notification signal indicative of allowance of charging from an electric vehicle (electric automobile). In this conventional example, operation check of an electric leakage detector is conducted under such a pseudo electric leakage state. When the electric leakage detector operates properly to open the relay as a result of the operation check, the controller closes the relay again and starts charging the electric vehicle.

In contrast, when the electric leakage detector does operate properly as a result of the operation check, the controller causes self electric leakage by the self leakage generator after a lapse of a predetermined time period, thereby conducting the operation check of the electric leakage detector again. Accordingly, the conventional example disclosed in Document 1 conducts the operation check of the electric leakage detector again multiple times in order to reduce a possibility of false detection.

The electric leakage detector of the conventional example includes a zero sequence current transformer to measure unbalance between currents flowing through a pair of power supply paths constituting the main circuit. The electric leakage detector is configured to compare a secondary output of the zero sequence current transformer corresponding to a magnitude of the unbalance between currents, with a threshold value, and to determine that electric leakage has occurred when the secondary output exceeds the threshold value.

Additionally, the self leakage generator of the conventional example includes a series circuit of a fixed resistor and a semiconductor switch, and the series circuit is electrically connected to the pair of power supply paths. Accordingly, the self leakage generator makes a short circuit between the pair of power supply paths by connecting them via the fixed resistor by turning on the semiconductor switch, and thereby cause unbalance between currents flowing through the pair of power supply paths, which leads to a pseudo electric leakage state (hereinafter, referred to as self electric leakage).

In a case of the self electric leakage caused by the self leakage generator, a magnitude of such an unbalance current flowing through the main circuit depends on a difference between electric potentials of the pair of power supply paths, which can be determined by the power supply voltage (effective value) of the AC power supply connected to the main circuit and the resistance of the fixed resistor of the self leakage generator.

Note that, the AC power supply has different power supply voltages depending on countries or regions (destinations), and may be classified into two major systems: a 100 V system and a 200 V system. In view of this, the self leakage generator of the conventional example is required to include a fixed resistor which is selected from the fixed resistor with the resistance corresponding to the power supply voltage of the 100 V system and the fixed resistor with the resistance corresponding to the power supply voltage of the 200 V system in accordance with a desired destination.

SUMMARY OF INVENTION

An object of the present invention would be to adapt to two or more types of AC power supplies having different effective values of a power supply voltage by use of a common structure.

The electric leakage protection device of one aspect according to the present invention includes an electric leakage detector, an electric leakage protector, and a self leakage generator. The electric leakage detector is configured to output an electric leakage detection signal, when a current leaked from a main circuit exceeds a threshold value. The electric leakage protector is configured to open a contact device interposed in the main circuit, when receiving the electric leakage detection signal. The self leakage generator includes; a first short circuit having a first electric resistance component and a first switch component electrically connected in series with each other, and a second short circuit having a second electric resistance component and a second switch component electrically connected in series with each other. The first short circuit and the second short circuit are electrically connected in parallel with each other with regard to a pair of power supply paths constituting the main circuit.

The feed control device of one aspect according to the present invention includes: a main circuit including a pair of power supply paths; a contact device interposed in the main circuit; and the electric leakage protection device of the above aspect for protecting the main circuit.

BRIEF DESCRIPTION OF DRAWINGS

FIG. 3 is a partial flow chart for illustrating operation of the electric leakage protection device.

DESCRIPTION OF EMBODIMENTS

Figure 1:
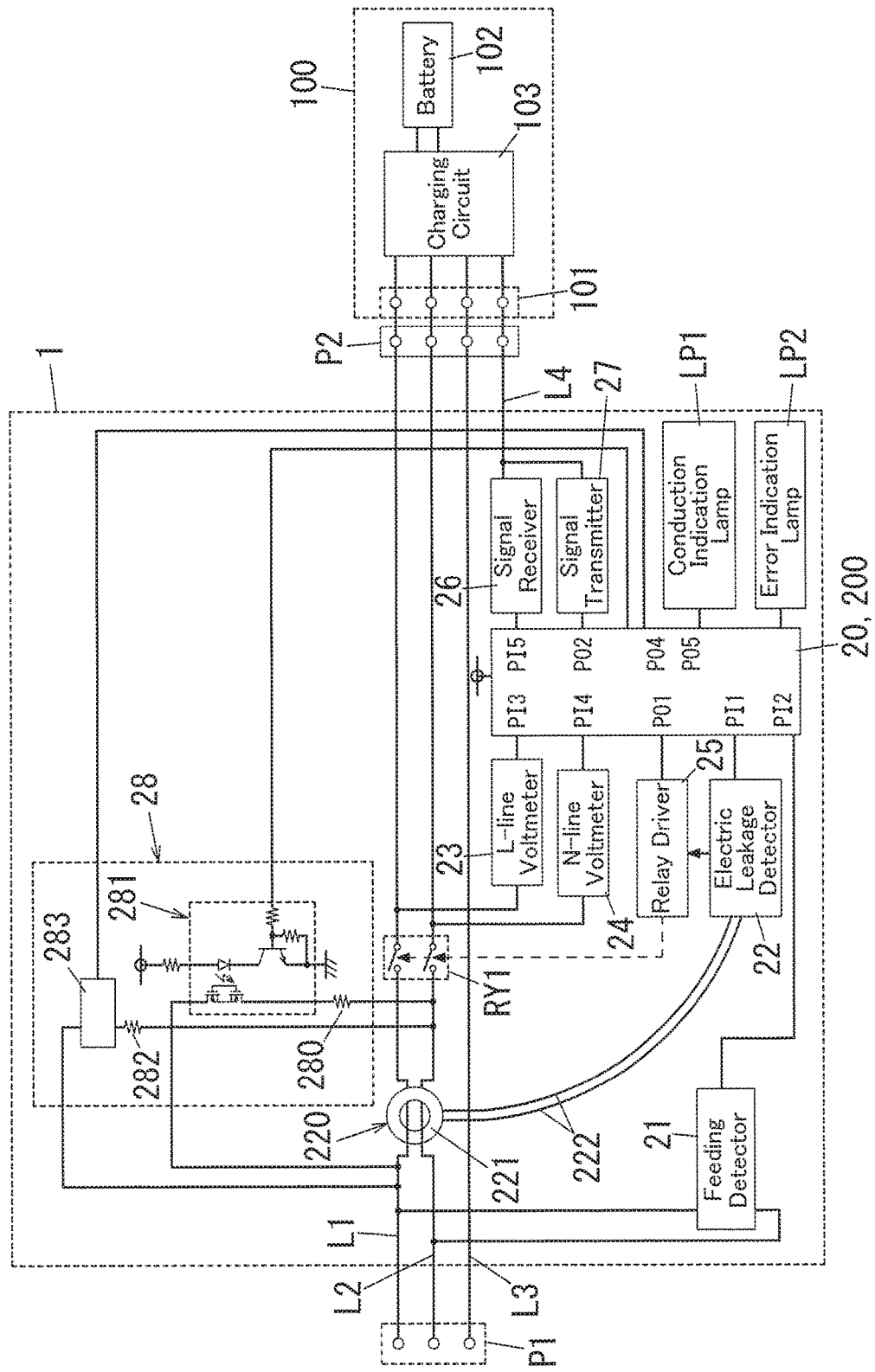
FIG. 1 is a block diagram of a feed control device including an electric leakage protection device of one embodiment in accordance with the present invention.
Figure 2:
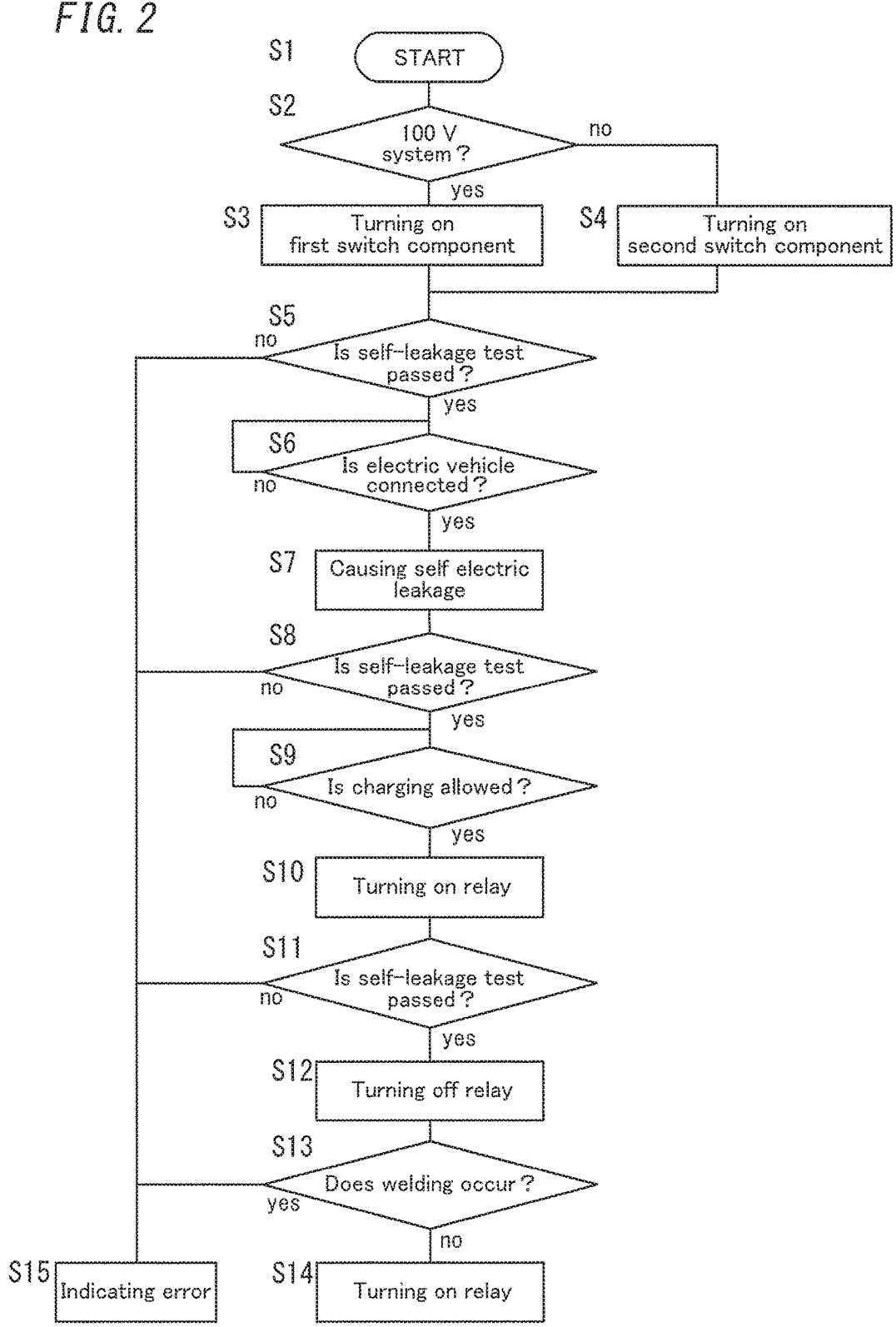
FIG. 2 is a flow chart for illustrating operation of the electric leakage protection device.

The following description referring to FIG. 1 and FIG. 2 is made to a feed control device 1 including an electric leakage protection device of one embodiment according to the present invention. However, the electric leakage protection device according to the present invention may be provided to a device other than such a feed control devices.

The feed control device 1 is used to form power supply paths from an external power supply such as a commercial AC power supply to a battery 102 included in an electric vehicle 100 and to control supply of power to the battery 102.

The electric vehicle 100 includes the battery 102 which may be a secondary battery such as a lithium ion battery. Further, the electric vehicle 100 includes a charging circuit 103 configured to receive power from the external power supply via a charging inlet 101 and then charge the battery 102. The electric vehicle 100 is configured to run by driving motors with power stored in the battery 102. The electric vehicle 100 may be an electric automobile, a plug-in hybrid vehicle, or a fuel cell vehicle, for example.

As shown in FIG. 1, the feed control device 1 includes a line (live line) L1 serving as a conduction path for a live conductor (L phase), a line (neutral line) L2 serving as a conduction path for a neutral conductor (N phase), and a line (ground line) L3 serving as a conduction path for a ground conductor, between the external power supply (the commercial AC power supply) and the electric vehicle 100. Note that, the live line (first power supply path) L1 and the neutral line (second power supply path) L2 constitute a pair of power supply paths (main circuit).

There is a power supply side plug (first plug) P1 electrically connected to first ends of the lines L1 to L3. This power supply side plug P1 is electrically connected, in a removable manner, to an outlet (for example, an electrical socket) electrically connected to the external power supply. Additionally, there is a vehicle side plug (second plug) P2 electrically connected to second ends of the lines L1 to L3. This vehicle side plug P2 is electrically connected, in a removable manner, to the charging inlet 101 of the electric vehicle 100.

The feed control device 1 includes the electric leakage protection device, the main circuit (the live line L1 and the neutral line L2) protected by the electric leakage protection device, a contact device (the relay RY1) provided to the main circuit, a relay driver 25 for opening and closing the contact device, and the controller 20.

The relay RY1 includes a pair of relay contacts individually interposed in the live line L1 and the neutral line L2. The relay RY1 is controlled to close the relay contacts (that is, the relay RY1 is turned on), which allows supply of power from the power supply side plug P1 to the vehicle side plug P2.

The controller 20 may be realized by a microcontroller (hereinafter, abbreviated to "micro"), for example. The controller 20 is configured to perform entire control of the electric leakage protection device and the feed control device 1. Accordingly, the controller 20 acts as a controller (electric leakage controller) 200 of the electric leakage protection device. However, the controller (electric leakage controller) 200 configured to perform entire control of the electric leakage protection device may be realized by hardware (for example, a micro) independent from the controller 20 of the feed control device 1.

Additionally, the feed control device 1 includes a feeding detector 21, an L line voltmeter 23, an N line voltmeter 24, a signal receiver 26, a signal transmitter 27, a conduction indication lamp LP1, and an error indication lamp LP2. Note that, the feeding detector 21, the L line voltmeter 23, the N line voltmeter 24, the signal receiver 26, the signal transmitter 27, the conduction indication lamp LP1, and the error indication lamp LP2 are optional.

The feeding detector 21 is configured to determine whether power is supplied from the external power supply, by detecting zero crossing of a voltage (potential difference) between parts of the live line L1 and the neutral line L2 between the relay RY1 and the power supply side plug P1. When the feeding detector 21 determines that power has been supplied from the external power supply, the controller 20 may turn on the conduction indication lamp LP1.

Note that, the feeding detector 21 of the present embodiment is configured to determine whether the external power supply is a 100 V system or a 200 V system based on a peak value of the voltage, and then output a result of determination to the controller 20. In other words, the feeding detector 21 serves as a voltmeter configured to measure a voltage applied between the pair of the power supply paths L1 and L2. The voltmeter is configured to determine whether the voltage measured by the voltmeter corresponds to a first power supply voltage or a second power supply voltage higher than the first power supply voltage and then output a result of determination to the controller 20. The first power supply voltage is a voltage corresponding to the external power supply (AC power supply) of the 100 V system, and the second power supply voltage is a voltage corresponding to the external power supply (AC power supply) of the 200 V system. Note that, the feeding detector 21 is not necessarily configured to act as the voltmeter.

The L line voltmeter 23 is configured to determine whether a voltage of the live line L1 (a potential difference between the live line L1 and the ground line L3) between the relay RY1 and the vehicle side plug P2 (a secondary side of the relay RY1) is not smaller than a predetermined threshold value. The N line voltmeter 24 is configured to determine whether a voltage of the neutral line L2 (a potential difference between the neutral line L2 and the ground line L3) between the relay RY1 and the vehicle side plug P2 (the secondary side of the relay RY1) is not lower than the predetermined threshold value.

The controller 20 is configured to determine that welding of the contact device (the relay contacts) has occurred, when at least one of the L line voltmeter 23 and the N line voltmeter detects a voltage equal to or larger than the threshold value while the contact device (the relay RY1) is opened (turned off). It is preferable that the controller 20 turn on the error indication lamp LP2 when determining that welding of the contact device has occurred.

The relay driver 25 is configured to control the relay RY1 according to a control signal inputted from the controller 20 to thereby close (turn on) and open (turn off) the relay contacts.

The signal receiver 26 is electrically connected to the electric vehicle 100 via a conduction path (hereinafter referred to as "signal line") L4 which is provided in addition to the conduction paths L1 to L3. The signal receiver 26 is configured to receive a control pilot signal (CPLT signal) transmitted through the signal line L4 from the electric vehicle 100 and output the received CPLT signal to an input port PI5 of the controller 20.

The signal transmitter 27 is configured to convert a transmission signal outputted from the output port PO2 of the controller 20 into the CPLT signal and then transmit it to the electric vehicle 100. Note that, the CPLT signal is well known as disclosed in Document 1, and therefore detailed description thereof is omitted.

Note that, the controller 20 is configured to turn on the error indication lamp LP2 to make announcement when an electric leakage detector 22 which is described below has detected electric leakage or when abnormality (for example, welding) of the relay RY1 has been detected.

The electric leakage protection device includes the electric leakage detector 22, an electric leakage protector (a relay driver) 25, and a self leakage generator 28. Further, in the present embodiment, the electric leakage protection device includes the electric leakage controller 200, the voltmeter (the feeding detector 21), and the error indication lamp LP2.

The electric leakage detector 22 is configured to output an electric leakage detection signal when a leakage current flowing from the main circuit (that is, a current leaked from the main circuit) exceeds a threshold value. For example, the electric leakage detector 22 includes a zero sequence current transformer 220 and is configured to output the electric leakage detection signal when an output voltage of the zero sequence current transformer 220 proportional to the leakage current flowing from the main circuit exceeds a threshold value.

The zero sequence current transformer 220 has the live line L1 and the neutral line L2 inserted through a core 221 with a circular ring shape and is configured to output, from an output line (secondary winding) 222, a voltage proportional to unbalance between currents flowing through the live line L1 and the neutral line L2. Note that, the electric leakage detection signal outputted from the electric leakage detector 22 is inputted into an input port PI1 of the controller 20 and the relay driver 25. The zero sequence current transformer 220 is positioned in relation to the pair of power supply paths L1 and L2 so as to be between a connection point between one of the pair of power supply paths L1 and L2 and the self leakage generator 28 and the other of the pair of power supply paths L1 and L2 and the self leakage generator 28. In FIG. 1, the self leakage generator 28 is connected to the first line L1 at a point closer to the first plug P1 than the zero sequence current transformer 220 is. Further, the self leakage generator 28 is connected to the second line L2 at a point closer to the second plug P2 than the zero sequence current transformer 220 is.

When receiving the electric leakage detection signal, the relay driver 25 operates the relay RY1 to open (turn off) the relay contacts. As understood from the above, the relay driver 25 functions as the electric leakage protector configured to open the contact device interposed in the main circuit when receiving the electric leakage detection signal. Accordingly, in the present embodiment, the relay driver 25 acts as the electric leakage protector.

The self leakage generator 28 includes a first short circuit having a first electric resistance component 280 and a first switch component 281 electrically connected in series with each other, and a second short circuit having a second electric resistance component 282 and a second switch component 283 electrically connected in series with each other. In other words, the first short circuit is a series circuit of the first electric resistance component 280 and the first switch component 281, and the second short circuit is a series circuit of the second electric resistance component 282 and the second switch component 283.

The first electric resistance component 280 and the second electric resistance component 282 each may be a single resistor or a series circuit of two or more resistors. An electric resistance of the first electric resistance component 280 may be equal to an electric resistance of the second electric resistance component 282. Note that, it is preferable that the electric resistance (resistance) of the first electric resistance component 280 be smaller than the electric resistance (resistance) of the second electric resistance component 282.

The first switch component 281 and the second switch component 283 each may be an opto-isolated SSR (short for a solid state relay), for example. The first switch component 281 is turned on and off according to the control signal outputted from an output port PO4 of the controller 20. Similarly, the second switch component 283 is turned on and off according to the control signal outputted from an output port PO5 of the controller 20. Note that, the aforementioned opto-isolated SSR is well-known and therefore detailed description of configuration and operation thereof is omitted. However, the first switch component 281 and the second switch component 283 each may not be limited to such an opto-isolated SSR.

The electric leakage controller 200 controls the self leakage generator 28. In more detail, the electric leakage controller 200 is configured to perform any one of a first process and a second process in accordance with a voltage measured by the voltmeter (the feeding detector) 21.

The first process is defined as a process of turning on the first switch component 281 while turning off the second switch component 283. The second process is defined as a process of turning on the second switch component 283 while turning off the first switch component 281. The electric leakage controller 200 is configured to perform the first process when the voltage measured by the voltmeter (the feeding detector) 21 corresponds to the first power supply voltage. The electric leakage controller 200 is configured to perform the second process when the voltage measured by the voltmeter 21 corresponds to the second power supply voltage. In summary, the first process corresponds to the first power supply voltage, and the second process corresponds to the second power supply voltage.

The first short circuit is configured to cause a short circuit between the live line L1 and the neutral line L2 by interconnecting them through the first electric resistance component 280 when the controller 20 turns on the first switch component 281. When the first short circuit causes a short circuit between the live line L1 and the neutral line L2, the leakage current (hereinafter referred to as a self leakage current) which depends on the electric resistance of the first electric resistance component 280 and the power supply voltage flows through the first short circuit. For example, when the external power supply has the power supply voltage (effective value) of 120 V, the self leakage current equal to or smaller than 7.5 mA flows provided that the first electric resistance component 280 has the resistance equal to or larger than 16 kΩ.

The second short circuit is configured to cause a short circuit between the live line L1 and the neutral line L2 by interconnecting them through the second electric resistance component 282 when the controller 20 turns on the second switch component 283. When the second short circuit causes a short circuit between the live line L1 and the neutral line L2, the leakage current (self leakage current) which depends on the electric resistance of the second electric resistance component 282 and the power supply voltage flows through the second short circuit. For example, when the external power supply has the power supply voltage (effective value) of 240 V, the self leakage current equal to or smaller than 7.5 mA flows provided that the second electric resistance component 282 has the resistance equal to or larger than 32 kΩ.

The resistance of the self leakage generator 28 for the first process and the resistance of the self leakage generator 28 for the second process are selected so as to cause a flow of a self leakage current equal to or smaller than a prescribed value (7.5 mA), for example. Note that, the prescribed value is selected appropriately in consideration of environment where the electric leakage protection device is supposed to be used.

The controller 20 determines that a self leakage test has been passed, when the electric leakage detection signal is inputted into the input port PI1 under as situation where the self leakage generator 28 causes a self leakage (causes a flow of the self leakage current). In contrast, the controller 20 determines that the self leakage test has not been passed, when the electric leakage detection signal is not inputted into the input port PI1 under the above situation. In addition, the controller 20 turns on the error indication lamp LP2 when determining that the self leakage test has not been passed.

As apparent from the above, the electric leakage controller 200 is configured to conduct the self leakage test. The electric leakage controller configured to, in the self leakage test, determine that the self leakage test has not been passed, when failing to receive the electric leakage detection signal within a predetermined time period from time of performing either the first process or the second process in response to the voltage measured by the voltmeter (the feeding detector) 21. The electric leakage controller 200 is configured to light the error indication lamp LP2, when determining that the self leakage test has not been passed.

Next, operation of the feed control device 1 of the present embodiment is described with reference to a flow chart of FIG. 2. Note that, in an initial state, each of the first switch component 281 and the second switch component 283 of the self leakage generator 28 is off.

When the power supply side plug P1 is connected to the inlet of the external power supply, AC power supply is supplied from the external power supply to the feed control device 1 and thus the feed control device 1 starts to operate (step S1). While the vehicle side plug P2 is not connected to the charging inlet of the electric vehicle 100, the controller 20 determines that the vehicle side plug P2 has not been connected to the electric vehicle 100 yet, based on the CPLT signal received by the signal receiver 26. Note that, the controller 20 keeps the relay RY1 off providing that the vehicle side plug P2 is not connected to the electric vehicle 100.

The controller 20 determines whether the power supply voltage measured by the feeding detector 21 corresponds to the 100 V system (step S2). If the power supply voltage corresponds to the 100 V system (step S2; yes), the controller 20 outputs the control signal from the output port PO4, thereby turning on the first switch component 281 (step S3). In contrast, if the power supply voltage measured by the feeding detector 21 corresponds to the 200 V system (step S2; no), the controller 20 outputs the control signal from the output port PO5, thereby turning on the second switch component 283 (step S4). Note that, the controller 20 may store a result of determination with regard to the power supply voltage in a built-in memory, for example.

When the first switch component 281 or the second switch component 283 is turned on, the self leakage current flows from the main circuit, and thus self leakage occurs. In this regard, the controller 20 selects the resistance (from the resistances of the first electric resistance component 280 and the second electric resistance component 282) for a path of short circuiting the main circuit, in accordance with the power supply voltage of the external power supply. In more detail, the controller 20 selects the first electric resistance component 280 with a relatively small resistance when the power supply voltage corresponds to the 100 V system, and selects the second electric resistance component 282 with a relatively large resistance when the power supply voltage corresponds to the 200 V system. Accordingly, one of the two electric resistance components 280 and 282 is selected in accordance with the power supply voltage. Therefore, almost the same self leakage current can flow from the main circuit in one case where the power supply voltage corresponds to the 100 V system and the other case where the power supply voltage corresponds to the 200 V system.

Providing that the electric leakage detector 22 operates properly, it detects the self leakage and then outputs the electric leakage detection signal. The controller 20 determines that the self leakage test has been passed, providing that the electric leakage detection signal is inputted into the input port PI1 within the predetermined time period (for example, a few seconds to more than ten but less than twenty seconds) from time of turning on the first switch component 281 or the second switch component 283, and determines that the self leakage test has not been passed, providing that the electric leakage detection signal is inputted into the input port PI1 within the predetermined time period from that time (step S5). When the self leakage test is determined to have not been passed, the controller 20 lights the error indication lamp LP2 to conduct error indication (step S15). Note that, after a lapse of the predetermined time period, the controller 20 turns off the switch component (the first switch component 281 or the second switch component 283) which has been turned on at step S3 or step S4.

When the self leakage test is determined to have been passed, the controller 20 waits until the vehicle side plug P2 is electrically connected to the charging inlet of the electric vehicle 100 (step S6). When receiving, by the signal receiver 26, the CPLT signal indicating that the vehicle side plug P2 has been electrically connected to the charging inlet (step S6; yes), the controller 20 instructs the self leakage generator 28 to cause self leakage again (step S7). In this regard, the controller 20 conducts the self leakage test by turning on the switch component (the first switch component 281 or the second switch component 283) corresponding to the result of the determination with regard to the power supply voltage stored in the built-in memory.

Note that, there may be a probability that the feed control device 1 of the present embodiment is left in a state where the power supply side plug P1 is still electrically connected to the inlet of the external power supply. In such a case, a step of connecting the power supply side plug P1 to the inlet may be omitted from the charging process, and thus the charging process may start from a step of electrically connecting the vehicle side plug P2 to the charging inlet 101 of the electric vehicle 100. In this case, the controller 20 starts the process from step S6. Accordingly, the controller 20 conducts the self leakage test even if the vehicle side plug P2 is electrically connected to the charging inlet. Thereby, it is possible to certainly confirm that the electric leakage detector 22 can operate properly, before charging the electric vehicle 100.

When the self leakage test is determined to have been passed (step S8; yes), the controller 20 waits until the signal receiver 26 receives from the electric vehicle 100 the CPLT signal indicative of permission of charging (step S8). In contrast, when the self leakage test is determined to have not been passed, the controller 20 lights the error indication lamp LP2 to conduct error indication (step S15). Note that, after a lapse of the predetermined time period, the controller 20 turns off the switch component (the first switch component 281 or the second switch component 283) which has been turned on at step S7.

When receiving by the signal receiver 26 the CPLT signal indicative of permission of charging (step S9; yes), the controller 20 outputs the control signal from the output port PO1 to control the relay driver 25 to turn on the relay RY1

(step S10). Thereafter, the controller 20 instructs the self leakage generator 28 to cause self leakage again to conduct the self leakage test. In this regard, the controller 20 conducts the self leakage test by turning on the switch component (the first switch component 281 or the second switch component 283) corresponding to the result of the determination with regard to the power supply voltage stored in the built-in memory. When the self leakage test is determined to have not been passed, the controller 20 lights the error indication lamp LP2 to conduct error indication (step S15). Note that, after a lapse of the predetermined time period, the controller 20 turns off the switch component (the first switch component 281 or the second switch component 283) which has been turned on at step S10.

Note that, the charging circuit 103 of the electric vehicle 100 may conduct timer-based operation. In such timer-based operation, the charging circuit 103 starts charging at designated start time by transmitting the CPLT signal indicative of permission of charging, and ends the charging at designated finish time by transmitting the CPLT signal indicative stop of charging. When the charging circuit 103 of the electric vehicle 100 conducts the timer-based operation, in some cases the controller 20 may result in waiting the CPLT signal indicating permission of charging from the electric vehicle 100 for several hours to more than ten but less than twenty hours. In this case, abnormality may occur in the electric leakage detector 22 while waiting for the signal. Accordingly, the controller 20 conducts the self leakage test even if receiving by the signal receiver 26 the CPLT signal indicative of permission of charging. Thereby, it is possible to certainly confirm that the electric leakage detector 22 can operate properly, before charging the electric vehicle 100.

When the electric leakage detector 22 operates properly, it detects self electric leakage and outputs the electric leakage detection signal to the controller 20. Therefore, the controller 20 determines that the self leakage test has been passed when the electric leakage detection signal is inputted into the input port PI1 (step S11; yes). Further, when detecting self electric leakage, the electric leakage detector 22 operates the relay driver 25 to turn off the relay RY1 (step S12). Both the voltages of the live line L1 and the neutral line L2 become zero on a secondary side of the relay RY1 providing that the relay contacts of the relay RY1 are not welded. The controller 20 determines whether the relay contacts have been welded, based on measurement results of the L line voltmeter 23 and the N line voltmeter 24 (S13). In more detail, when a voltage equal to or larger than the threshold value is developed on the secondary side of the relay RY1, the controller 20 determines that the relay contacts have been welded and then turns on the error indication lamp LP2 (step S15). In contrast, when the voltage developed on the secondary side of the relay RY1 is smaller than the threshold value, the controller 20 determines that the relay contacts have not been welded (that is, opened) and then controls the relay driver 25 to turn on the relay RY1 (step S14). Note that, it is preferable that the controller 20 differentiate between patterns of lighting the error indication lamp LP2 for a case where the self leakage test has not been passed and another case where the relay contacts are determined to have been welded.

Note that, when both the first switch component 281 and the second switch component 283 are turned on, a parallel circuit of the first electric resistance component 280 and the second electric resistance component 282 is electrically connected between the live line L1 and the neutral line L2. In this case, a combined resistance of the parallel circuit is smaller than the resistance of the first electric resistance component 280 and the resistance and the second electric resistance component 282. Therefore, when the power supply voltage corresponds to the 200 V system, both the first switch component 281 and the second switch component 283 are turned on. In contrast, when the power supply voltage corresponds to the 100 V system, either the first switch component 281 or the second switch component 283 may be turned on. In this case, the first electric resistance component 280 and the second electric resistance component 282 may have the same resistance.

In other words, in a case where the resistance of the first electric resistance component 280 and the resistance of the second electric resistance component 282 are equal to each other, the first process may be defined as a process of turning on both the first switch component 281 and the second switch component 283, and the second process may be defined as a process of turning on the second switch component 283 while turning off the first switch component 281.

The feeding detector 21 is not necessarily configured to act as the voltmeter (in other words, the electric leakage protection device may not include the voltmeter). In such a case, the electric leakage controller 200 performs a determining process of determining the power supply voltage applied to the main circuit. In the determining process, the electric leakage controller 200 determines that the power supply voltage of the power supply connected to the main circuit is the first power supply voltage when succeeding in receiving the electric leakage detection signal within a predetermined time period from time of performing the first process but failing to receive the electric leakage detection signal within the predetermined time period from time of performing the second process. In the determining process, the electric leakage controller 200 determines that the power supply voltage of the power supply connected to the main circuit is the second power supply voltage when succeeding in receiving the electric leakage detection signal within the predetermined time period from time of performing the first process and also succeeding in receiving the electric leakage detection signal within the predetermined time period from time of performing the second process. The electric leakage controller 200 determines that the self leakage test has not been passed, when failing to receive the electric leakage detection signal within the predetermined time period from time of performing either the first process or the second process in accordance with a result of the determining process. In summary, in a case where the result of the determining process indicates that the power supply voltage is the first power supply voltage, the electric leakage controller 200 performs the first process in the self leakage test. The electric leakage controller 200 determines that the self leakage test has not been passed providing that the electric leakage detection signal is obtained within the predetermined time period from time of performing the first process. In contrast, in a case where the result of the determining process indicates that the power supply voltage is the second power supply voltage, the electric leakage controller 200 performs the second process in the self leakage test. The electric leakage controller 200 determines that the self leakage test has not been passed providing that the electric leakage detection signal is obtained within the predetermined time period from time of performing the second process.

For example, as shown in the flow chart of FIG. 3, the feed control device 1 starts operating (step SS1) when the power supply side plug P1 is connected to the inlet of the external power supply and then the external power supply supplies AC power to the feed control device 1. Accordingly, the controller 20 turns on the first switch component 281 and the second switch component 283 (step SS2).

When the first switch component 281 and the second switch component 283 are turned on, the self leakage current flows from the main circuit, which results in self electric leakage. The electric leakage detector 22 detects the self electric leakage and then outputs the electric leakage detection signal, providing that it operates properly. The controller 20 determines that the self leakage test has been passed when the electric leakage detection signal is inputted into the input port PI1 within the predetermined time period, or the controller 20 determines that the self leakage test has not been passed when the electric leakage detection signal is not inputted into the input port PI1 within the predetermined time period (step SS3). When the self leakage test is determined to have not been passed, the controller 20 turns on the error indication lamp LP2 to conduct error indication (step SS8).

When the self leakage test is determined to have been passed, the controller 20 turns off the first switch component 281 and on the second switch component 283 (step SS4). When the electric leakage detector 22 operates properly and the power supply voltage corresponds to the 200 V system, the electric leakage detector 22 detects the self electric leakage based on the self leakage current flowing through the second short circuit and outputs the electric leakage detection signal. The controller 20 determines that the power supply voltage corresponds to the 200 V system when the electric leakage detection signal is inputted within the predetermined time period (step SS6). In contrast, when the power supply voltage corresponds to the 100 V system, the self leakage current flowing through the second short circuit is relatively small. Consequently, the electric leakage detector 22 fails to detect self electric leakage and does not output the electric leakage detection signal. For this reason, the controller 20 determines that the power supply voltage corresponds to the 100 V system, providing that the electric leakage detection signal is not inputted within the predetermined time period (step SS7). The controller 20 stores the result of determination with regard to the power supply voltage in its built-in memory, and performs the steps following step S6 in FIG. 2. Note that, with regard to the steps following step S6 in FIG. 2, it is preferable that the controller 20 turn on the first switch component 281 and the second switch component 283 to cause self electric leakage when the power supply voltage corresponds to the 100 V system. Optionally, with regard to the steps following step S6 in FIG. 2, it is preferable that the controller 20 turn on the second switch component 283 only to cause self electric leakage when the power supply voltage corresponds to the 200 V system. Note that, description of the steps following step S6 in FIG. 2 is omitted to avoid redundancy.

As described above, the electric leakage protection device of the present embodiment includes the electric leakage detector 22, the electric leakage protector (the relay driver 25), and the self leakage generator 28. The electric leakage detector 22 is configured to output the electric leakage detection signal, when the current leaked from the main circuit exceeds the threshold value. The electric leakage protector (the relay driver 25) is configured to open the contact device (the relay RY1) interposed in the main circuit, when receiving the electric leakage detection signal. The self leakage generator 28 includes the first short circuit having the first electric resistance component 280 and the first switch component 281 electrically connected in series with each other, and the second short circuit having the second electric resistance component 282 and the second switch component 283 electrically connected in series with each other. The first short circuit and the second short circuit are electrically connected in parallel with each other with regard to the pair of power supply paths (the live line L1 and the neutral line L2) constituting the main circuit.

Further, the feed control device 1 of the present embodiment includes the electric leakage protection device, the main circuit protected by the electric leakage protection device, and the controller 20 for opening and closing the contact device provided to the main circuit.

The electric leakage protection device (the feed control device 1) of the present embodiment is configured as above, and thereby, in contrast to the conventional example, can be adapted to two or more types of AC power supplies having different effective values of a power supply voltage by use of a common structure.

Additionally, in the electric leakage protection device (the feed control device 1) of the present embodiment, it is preferable that the resistance of the first electric resistance component 280 and the resistance of the second electric resistance component 282 be different from each other.

Further, it is preferable that the electric leakage protection device (the feed control device 1) of the present embodiment include the voltmeter (the feeding detector 21) configured to measure a voltage applied to the main circuit. Furthermore, it is preferable that the self leakage generator 28 be configured to turn on either the first switch component 281 or the second switch component 283 in accordance with the voltage measured by the voltmeter (the feeding detector 21).

As described above, the electric leakage protection device of the first aspect in accordance with the present invention includes an electric leakage detector (22), an electric leakage protector (25), and a self leakage generator (28). The electric leakage detector (22) is configured to output an electric leakage detection signal, when a current leaked from a main circuit exceeds a threshold value. The electric leakage protector (25) is configured to open a contact device (RY1) interposed in the main circuit, when receiving the electric leakage detection signal. The self leakage generator (28) includes a first short circuit having a first electric resistance component (280) and a first switch component (281) electrically connected in series with each other, and a second short circuit having a second electric resistance component (282) and a second switch component (283) electrically connected in series with each other. The first short circuit and the second short circuit are electrically connected in parallel with each other with regard to a pair of power supply paths (L1 and L2) constituting the main circuit.

In the electric leakage protection device of the second aspect which would be realized in combination with the first aspect, the self leakage generator (28) is connected between the pair of power supply paths (L1 and L2).

In the electric leakage protection device of the third aspect which would be realized in combination with the first or second aspect, the electric leakage detector (22) is configured to measure a current leaked from the main circuit based on an output voltage of a zero sequence current transformer (220). The zero sequence current transformer (220) is positioned in relation to the pair of power supply paths (L1 and L2) so as to be between a connection point between one of the pair of power supply paths (L1 and L2) and the self leakage generator (28) and the other of the pair of power supply paths (L1 and L2) and the self leakage generator (28).

In the electric leakage protection device of the fourth aspect which would be realized in combination with any one of the fifth to third aspects, the electric leakage protection device further includes: a voltmeter (21) configured to measure a voltage applied across the main circuit; and a controller (200) configured to control the self leakage generator (28). The controller (200) is configured to perform any one of a first process and a second process in accordance with the voltage measured by the voltmeter (21). The first process is defined as a process of turning on the first switch component (281) while turning off the second switch component (283), or another process of turning on both the first switch component (281) and the second switch component (283). The second process is defined as a process of turning on the second switch component while turning off the first switch component (281).

In the electric leakage protection device of the fifth aspect which would be realized in combination with the fourth aspect, a resistance of the first electric resistance component (280) and a resistance of the second electric resistance component (282) are different from each other.

In the electric leakage protection device of the sixth aspect which would be realized in combination with the fifth aspect, the resistance of the first electric resistance component (280) is smaller than the resistance of the second electric resistance component (282). The controller (200) is configured to perform the first process, when the voltage measured by the voltmeter (21) corresponds to a first power supply voltage. The controller (200) is configured to perform the second process, when the voltage measured by the voltmeter (21) corresponds to a second power supply voltage higher than the first power supply voltage.

In the electric leakage protection device of the seventh aspect which would be realized in combination with the fourth aspect, a resistance of the first electric resistance component (280) and a resistance of the second electric resistance component (282) are equal to each other. The controller (200) is configured to perform the first process, when the voltage measured by the voltmeter (21) corresponds to a first power supply voltage. The controller (200) is configured to perform the second process, when the voltage measured by the voltmeter (21) corresponds to a second power supply voltage higher than the first power supply voltage. The first process is defined as a process of turning on both the first switch component (281) and the second switch component (283).

In the electric leakage protection device of the eighth aspect which would be realized in combination with any one of the fourth to seventh aspects, the controller (200) is configured to determine that a self leakage test has not been passed, when failing to receive the electric leakage detection signal within a predetermined time period from time of performing either the first process or the second process in response to the voltage measured by the voltmeter (21).

In the electric leakage protection device of the ninth aspect which would be realized in combination with the eighth aspect, the electric leakage protection device further includes an error indication lamp. The controller (200) is configured to light the error indication lamp, when determining that the self leakage test has not been passed.

The electric leakage protection device of the tenth aspect would be realized in combination with any one of the first to third aspects and further includes a controller (200) configured to control the self leakage generator (28). The controller (200) is configured to perform a first process corresponding to a first power supply voltage and a second process corresponding to a second power supply voltage higher than the first power supply voltage. A resistance of the first electric resistance component (280) is smaller than a resistance of the second electric resistance component (282). The first process is defined as a process of turning on the first switch component (281) while turning off the second switch component (283), or another process of turning on both the first switch component (281) and the second switch component (283). The second process is defined as a process of turning on the second switch component while turning off the first switch component (281). The controller (200) is configured to perform a determining process of determining a power supply voltage of a power supply connected to the main circuit. The controller (200) is configured to, in the determining process, determine that the power supply voltage is the first power supply voltage when succeeding in receiving the electric leakage detection signal within a predetermined time period from time of performing the first process but failing to receive the electric leakage detection signal within the predetermined time period from time of performing the second process, and determine that the power supply voltage is the second power supply voltage when succeeding in receiving the electric leakage detection signal within the predetermined time period from time of performing the first process and also succeeding in receiving the electric leakage detection signal within the predetermined time period from time of performing the second process. The controller (200) is configured to determine that a self leakage test has not been passed, when failing to receive the electric leakage detection signal within the predetermined time period from time of performing either the first process or the second process in accordance with a result of the determining process.

The electric leakage protection device of the eleventh aspect would be realized in combination with any one of the first to third aspects and further includes a controller (200) configured to control the self leakage generator (28). The controller (200) is configured to perform a first process corresponding to a first power supply voltage and a second process corresponding to a second power supply voltage higher than the first power supply voltage. A resistance of the first electric resistance component (280) is equal to a resistance of the second electric resistance component (282). The first process is defined as a process of turning on both the first switch component (281) and the second switch component (283). The second process is defined as a process of turning on the second switch component (283) while turning off the first switch component (281). The controller (200) is configured to perform a determining process of determining a power supply voltage of a power supply connected to the main circuit. The controller (200) is configured to, in the determining process, determine that the power supply voltage is the first power supply voltage when succeeding in receiving the electric leakage detection signal within a predetermined time period from time of performing the first process but failing to receive the electric leakage detection signal within the predetermined time period from time of performing the second process, and determine that the power supply voltage is the second power supply voltage when succeeding in receiving the electric leakage detection signal within the predetermined time period from time of performing the first process and also succeeding in receiving the electric leakage detection signal within the predetermined time period from time of performing the second process. The controller (200) is configured to determine that a self leakage test has not been passed, when failing to receive the electric leakage detection signal within the predetermined time period from time of performing either the first process or the second process in accordance with a result of the determining process.

The feed control device of the twelfth aspect in accordance with the present invention includes: a main circuit including a pair of power supply paths (L1 and L2); a contact device (RY1) interposed in the main circuit; and the electric leakage protection device of any one of the first to eleventh aspects for protecting the main circuit.

The electric leakage protection device and the feed control device of aspects according to the present invention can be adapted to two or more types of AC power supplies having different effective values of a power supply voltage by use of a common structure.

The invention claimed is:

1. A feed control device to be used to form power supply paths from an external power supply to a battery included in an electric vehicle and to control supply of power to the battery, the feed control device comprising:
a main circuit including the pair of power supply paths;
a contact device interposed in the main circuit;
a controller opening and closing the contact device,
an electric leakage protection device; and
a signal receiver configured to receive a signal transmitted from the electric vehicle, wherein,
the electric leakage protection device, comprises:
an electric leakage detector configured to output an electric leakage detection signal, when a current leaked from a main circuit exceeds a threshold value;
an electric leakage protector configured to open a contact device interposed in the main circuit, when receiving the electric leakage detection signal; and
a self leakage generator including a first short circuit having a first electric resistance component and a first switch component electrically connected in series with each other, and a second short circuit having a second electric resistance component and a second switch component electrically connected in series with each other,
the first short circuit and the second short circuit being electrically connected in parallel with each other with regard to a pair of power supply paths constituting the main circuit, and
the controller being configured to control the self leakage generator and configured to instruct the self leakage generator to cause self leakage when receiving the signal by the signal receiver.

2. The feed control device of claim 1, wherein the self leakage generator is connected between the pair of power supply paths.

3. The feed control device of claim 1, wherein:
the electric leakage detector is configured to measure a current leaked from the main circuit based on an output voltage of a zero sequence current transformer; and
the zero sequence current transformer is positioned in relation to the pair of power supply paths so as to be between a connection point between one of the pair of power supply paths and the self leakage generator and the other of the pair of power supply paths and the self leakage generator.

4. The feed control device of claim 1, further comprising:
a voltmeter configured to measure a voltage applied across the main circuit,
wherein:
the controller is configured to perform any one of a first process and a second process in accordance with the voltage measured by the voltmeter;
the first process is defined as a process of turning on the first switch component while turning off the second switch component, or another process of turning on both the first switch component and the second switch component; and the second process is defined as a process of turning on the second switch component while turning off the first switch component.

5. The feed control device of claim 4, wherein a resistance of the first electric resistance component and a resistance of the second electric resistance component are different from each other.

6. The feed control device of claim 5, wherein:
the resistance of the first electric resistance component is smaller than the resistance of the second electric resistance component;
the controller is configured to perform the first process, when the voltage measured by the voltmeter corresponds to a first power supply voltage; and
the controller is configured to perform the second process, when the voltage measured by the voltmeter corresponds to a second power supply voltage higher than the first power supply voltage.

7. The feed control device of claim 4, wherein a resistance of the first electric resistance component and a resistance of the second electric resistance component are equal to each other;
the controller is configured to perform the first process, when the voltage measured by the voltmeter corresponds to a first power supply voltage;
the controller is configured to perform the second process, when the voltage measured by the voltmeter corresponds to a second power supply voltage higher than the first power supply voltage; and
the first process is defined as a process of turning on both the first switch component and the second switch component.

8. The feed control device of claim 4, wherein the controller is configured to determine that a self leakage test has not been passed, when failing to receive the electric leakage detection signal within a predetermined time period from time of performing either the first process or the second process in response to the voltage measured by the voltmeter.

9. The feed control device of claim 8, further comprising:
an error indication lamp,
wherein the controller is configured to light the error indication lamp, when determining that the self leakage test has not been passed.

10. The feed control device of claim 1,
wherein:
the controller is configured to perform a first process corresponding to a first power supply voltage and a second process corresponding to a second power supply voltage higher than the first power supply voltage;
a resistance of the first electric resistance component is smaller than a resistance of the second electric resistance component;
the first process is defined as a process of turning on the first switch component while turning off the second switch component, or another process of turning on both the first switch component and the second switch component;
the second process is defined as a process of turning on the second switch component while turning off the first switch component;
the controller is configured to perform a determining process of determining a power supply voltage of a power supply connected to the main circuit;
the controller is configured to, in the determining process, determine that the power supply voltage is the first power supply voltage when succeeding in receiving the electric leakage detection signal within a predetermined time period from time of performing the first process but failing to receive the electric leakage detection signal within the predetermined time period from time of performing the second process, and determine that the power supply voltage is the second power supply voltage when succeeding in receiving the electric leakage detection signal within the predetermined time period from time of performing the first process and also succeeding in receiving the electric leakage detection signal within the predetermined time period from time of performing the second process; and the controller is configured to determine that a self leakage test has not been passed, when failing to receive the electric leakage detection signal within the predetermined time period from time of performing either the first process or the second process in accordance with a result of the determining process.

11. The feed control device of claim 1, wherein:

the controller is configured to perform a first process corresponding to a first power supply voltage and a second process corresponding to a second power supply voltage higher than the first power supply voltage;

a resistance of the first electric resistance component is equal to a resistance of the second electric resistance component;

the first process is defined as a process of turning on both the first switch component and the second switch component;

the second process is defined as a process of turning on the second switch component while turning off the first switch component;

the controller is configured to perform a determining process of determining a power supply voltage of a power supply connected to the main circuit;

the controller is configured to, in the determining process, determine that the power supply voltage is the first power supply voltage when succeeding in receiving the electric leakage detection signal within a predetermined time period from time of performing the first process but failing to receive the electric leakage detection signal within the predetermined time period from time of performing the second process, and determine that the power supply voltage is the second power supply voltage when succeeding in receiving the electric leakage detection signal within the predetermined time period from time of performing the first process and also succeeding in receiving the electric leakage detection signal within the predetermined time period from time of performing the second process; and the controller is configured to determine that a self leakage test has not been passed, when failing to receive the electric leakage detection signal within the predetermined time period from time of performing either the first process or the second process in accordance with a result of the determining process.

* * * * *